United States Patent [19]

Oukouchi

[11] Patent Number: 5,445,472
[45] Date of Patent: Aug. 29, 1995

[54] JOINT ASSEMBLY

[75] Inventor: Terunaga Oukouchi, Tokyo, Japan

[73] Assignee: Takigen Manufacturing Co., Ltd., Tokyo, Japan

[21] Appl. No.: 191,808

[22] Filed: Feb. 3, 1994

[30] Foreign Application Priority Data

Feb. 23, 1993 [JP] Japan ................... 5-057795

[51] Int. Cl.⁶ .............................. F16B 7/00
[52] U.S. Cl. ................... 403/348; 403/325; 403/409.1
[58] Field of Search .......... 403/350, 348, 349, 354, 403/315, 320, 325, 154, 409.1, 24, 25, 154, 256, 257, 258, 259

[56] References Cited

U.S. PATENT DOCUMENTS

| | | | |
|---|---|---|---|
| 2,697,581 | 12/1954 | Ray | 403/348 X |
| 3,208,302 | 9/1965 | Lewis et al. | 403/258 X |
| 3,912,411 | 10/1975 | Moffat | 403/259 |
| 4,597,499 | 7/1986 | Hanula | 403/154 X |
| 4,657,428 | 4/1987 | Wiley | 403/256 X |
| 4,711,596 | 12/1987 | Bruderer | 403/348 |
| 4,730,952 | 3/1988 | Wiley | 403/349 X |

Primary Examiner—Randolph A. Reese
Assistant Examiner—Harry C. Kim
Attorney, Agent, or Firm—Martin Smolowitz

[57] ABSTRACT

In a drag-free joint assembly: a stationary body 1 is embedded flush in a connected object 10; a rotary shaft 7 is embedded flush in the body 1; a spring 4 is in a cavity 15 of the shaft 7; a locking shaft 2 is inserted in an upper end of the cavity 15 flush with the shaft 7; a lock pin 3 passes through an axially-elongated through-hole 17 of the shaft 7 and is inserted into a through-hole 16 of the shaft 2; a notch 8 is in an inner surface of the body 1 to permit an end of the pin 3 to move when the shaft 2 is rotated; the notch 8 has an axially-extending locking groove 9 in an end of its bottom surface; the groove 9 engages with the end of the pin 3; and a hole 11 is in the other object 12; whereby the pin 3 engages with the groove 9 when the shaft 7 is rotated to have the plate 5 crossed with the hole 11 at a right angle behind the hole.

3 Claims, 6 Drawing Sheets

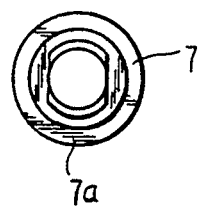
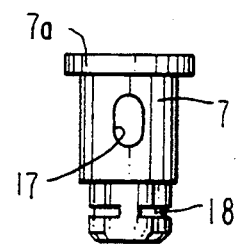
FIG.13          FIG.14
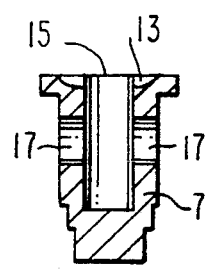
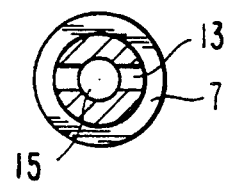
FIG.15          FIG.16

JOINT ASSEMBLY

BACKGROUND OF THE INVENTION

1. Field of the Invention

The present invention relates to a joint assembly for connecting a cover plate flush with a body of a very high speed vehicle in its coupling portion.

2. Description of the Prior Art

Since a conventional joint assembly used in a coupling portion of a very high speed vehicle has many projecting portions, many turbulence flows, eddies and the like are produced in the vicinity of the joint assembly when the vehicle travels at very high speed, which increases drag to slow down the vehicle in traveling.

SUMMARY OF THE INVENTION

It is an object of the present invention to provide a joint assembly which firmly connects a pair of objects with each other, and prevents turbulence flows, eddies and the like from occurring in the vicinity of a coupling portion of a very high speed vehicle when the joint assembly is used in the coupling portion of the vehicle, which reduces drag.

The above object of the present invention is accomplished by providing:

a joint assembly comprising:
- a stationary body fixedly embedded in one of two objects so as to have its surface be flush with a surface of the one object, the objects being connected with each other;
- a rotary shaft rotatably embedded in the stationary body so as to have its front-end surface be flush with a front-end surface of the stationary body;
- a holding-member plate fixedly mounted on a lower-end portion of the rotary shaft;
- a compression coil spring axially inserted in a central cavity portion of the rotary shaft;
- a locking shaft inserted in an upper-end portion of the central cavity portion and having its front-end surface be flush with the front-end surface of the rotary shaft;
- a lock pin which passes through an axially-elongated through-hole of the rotary shaft and is inserted into a through-hole of the locking shaft, the axially-elongated through hole extending in a diametrical direction of the rotary shaft, the through-hole extending in a diametrical direction of the locking shaft;
- a notch portion provided in an inner peripheral surface of the stationary body to permit an end portion of the lock pin to be movable when the locking shaft is rotatably driven, the notch portion being provided with an axially-extending locking groove in an end portion of its bottom surface, the locking groove being engaged with the end portion of the lock pin; and
- a receiving hole provided in the other one of the objects, the receiving hole permitting both the holding-member plate and a front-end portion of the rotary shaft to pass therethrough;

whereby the lock pin is engaged with the locking groove when the rotary shaft is rotated so that the holding-member plate is crossed with the receiving hole of the other one of the objects at an angle of 90° behind the receiving hole.

BRIEF DESCRIPTION OF THE DRAWINGS

FIG. 13 is a rear view of the rotary shaft shown in FIG. 11;

FIG. 14 is a left-side view of the rotary shaft shown in FIG. 11;

FIG. 15 is a sectional view of the rotary shaft, taken along the line 15—15 of FIG. 11;

FIG. 16 is a front view of the rotary shaft, taken along the line 16—16 of FIG. 12;

DESCRIPTION OF THE PREFERRED EMBODIMENTS

Figure 1:
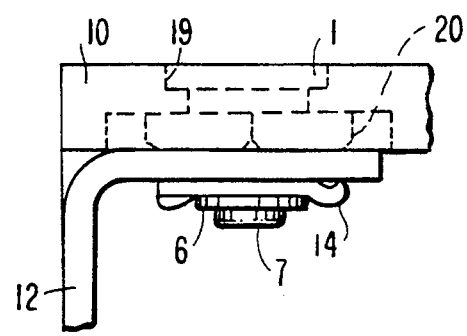
FIG. 1 is a bottom view of an embodiment of the joint assembly of the present invention connected with a cover plate used in the coupling portion of a very high speed vehicle.
Figure 2:
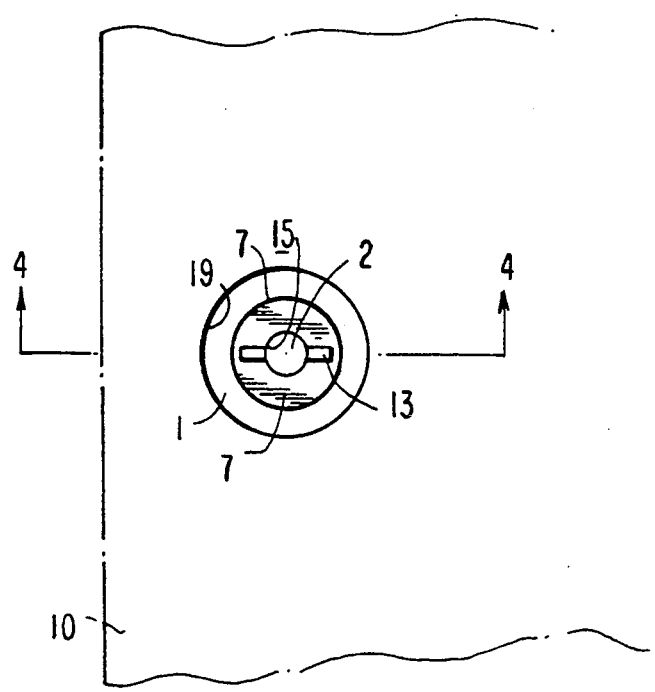
FIG. 2 is a front view of the joint assembly of the present invention shown in FIG. 1.
Figure 3:
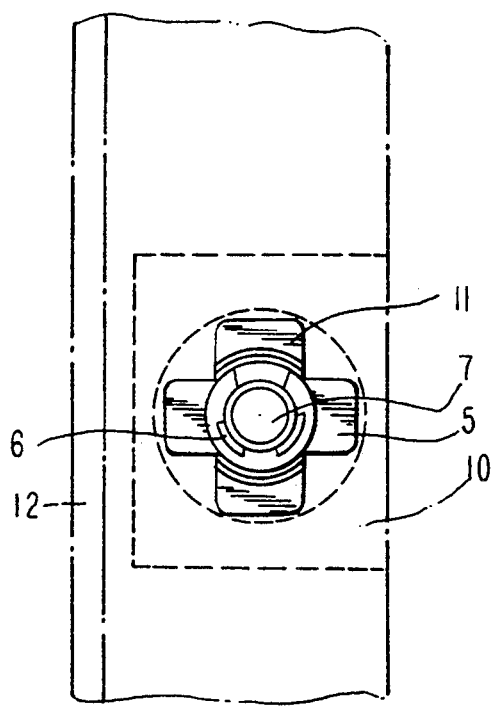
FIG. 3 is a rear view of the joint assembly of the present invention shown in FIG. 1.
Figure 4:
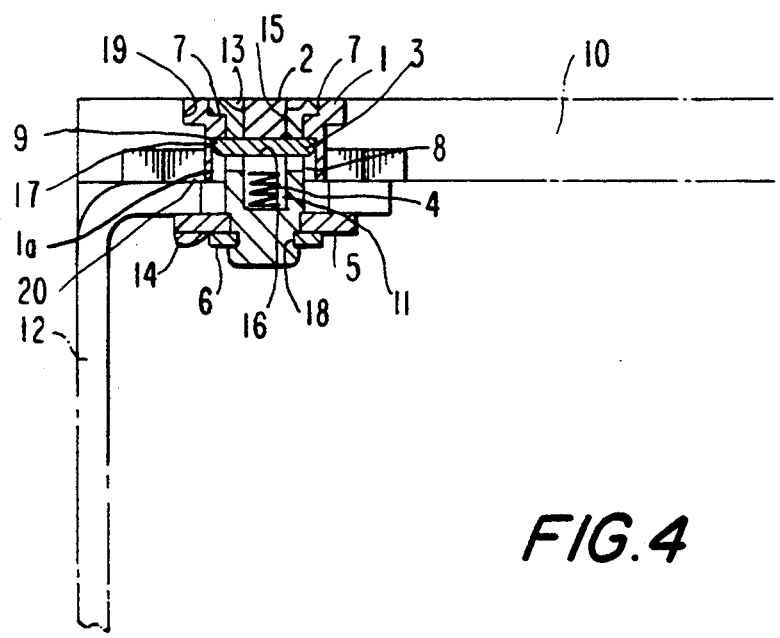
FIG. 4 is a sectional view of the joint assembly of the present invention, taken along the line 4—4 of FIG. 2.
Figure 5:
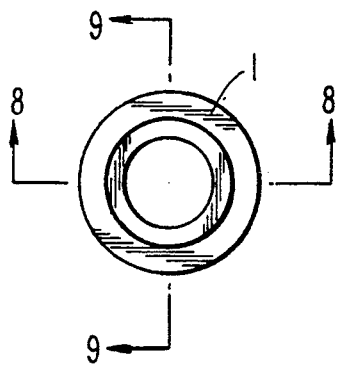
FIG. 5 is a front view of the stationary main body used in the joint assembly of the present invention shown in FIG. 1.
Figure 6:
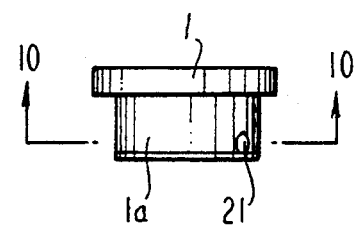
FIG. 6 is a bottom view of the stationary main body shown FIG. 5.
Figure 7:
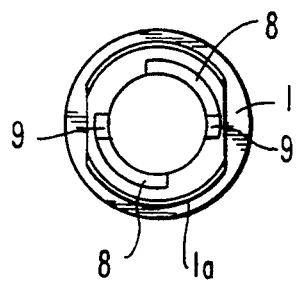
FIG. 7 is a rear view of the stationary main body shown FIG. 5.
Figure 8:
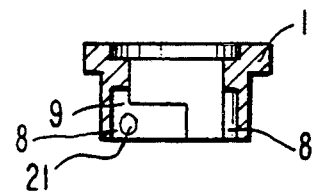
FIG. 8 a sectional view of the stationary main body, taken along the line 8—8 of FIG. 5.
Figure 9:
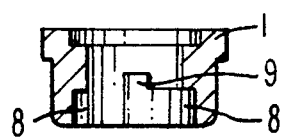
FIG. 9 is a sectional view of the stationary main body, taken along the line 9—9 of FIG. 5; the joint assembly of tile present invention.
Figure 10:
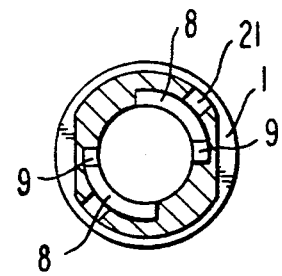
FIG. 10, is a sectional view of the stationary main body, taken along the line 10—10 of FIG. 6.
Figure 11:
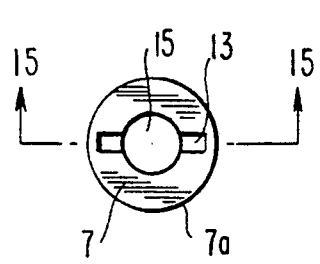
FIG. 11 is a front view of the rotary shaft used in the joint assembly of the present invention shown in FIG. 1.
Figure 12:
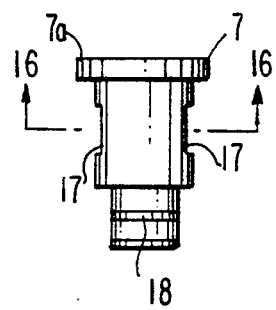
FIG. 12 is a bottom view of the rotary shaft shown in FIG. 11.
Figure 17:
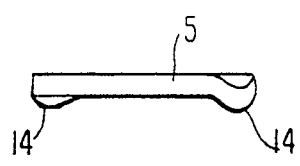
FIG. 17 is a bottom view of the set-member plate used in the joint assembly shown in FIG. 1.
Figure 18:
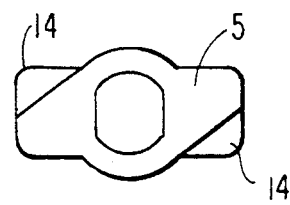
FIG. 18 is a front view of the set-member plate of FIG. 17.
Figure 19:
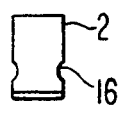
FIG. 19 is a bottom view of the locking shaft used in the joint assembly of the present invention shown in FIG. 1.
Figure 20:
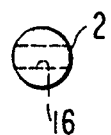
FIG. 20 is a front view of the locking shaft of FIG. 19.
Figure 21:
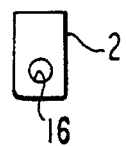
FIG. 21 is a right-side view of the locking shaft of FIG. 19.

Hereinbelow, the present invention will be described in detail with reference to the accompanying drawings and the reference numerals and characters.

In a joint assembly of the present invention, a stationary body 1 is fixedly embedded in one object 10 of the objects 10, 12 being joined together so as to have the surface of the body 1 be flush with a surface of the one object 10, the objects 10, 12 being firmly connected with each other. A rotary shaft 7 is rotatably embedded in the stationary body 1 so as to have its front-end surface be flush with a front-end surface of the stationary body 1. A holding-member plate 5 is fixedly mounted on a lower-end portion of the rotary shaft 7. A compression coil spring 4 is axially inserted in a central cavity portion 19 of the rotary shaft 7. A locking shaft 2 is inserted in an upper-end portion of the central cavity portion 19 and has its front-end surface be flush with the front-end surface of the rotary shaft 7. A lock pin 3 passes through a pair of diametrically-arranged and axially-elongated through-holes 17 of the rotary shaft 7, and is inserted into a through-hole 16 of the locking shaft 2. Each of the axially-elongated through holes 17 of the rotary shaft 7 extends in a diametrical direction of the rotary shaft 7. On the other hand, the through-hole 16 of the locking shaft 2 extends in a diametrical direction of the locking shaft 2.

A pair of diametrically-arranged notch portions 8 are provided in an inner peripheral surface of the stationary body 1 to permit opposite end portions of the lock pin 3 to be movable when the locking shaft 2 is rotatably driven. Each of the notch portions 8 of the stationary body 1 is provided with an axially-extending locking groove 9 in an end portion of its bottom surface. Each of the locking grooves 9 is engaged with each of the opposite end portions of the lock pin 3. A receiving hole 11 is provided in the other one object 12 of the objects 10, 12 to permit both the holding-member plate 5 and a front-end portion of the rotary shaft 7 to pass therethrough. Consequently, the lock pin 3 is engaged with the locking grooves 9 of tile stationary body 1 when the rotary shaft 7 is rotated, so that the holding-member plate 5 is crossed with the receiving hole 11 of the other one 12 of the objects 10, 12 behind the object 12.

In the joint assembly of the present invention, in a condition in which the object 10, are not connected with each other, the opposite end portions of the lock pin 3 abut against end portions oppositely disposed from the locking grooves 9 of a bottom surface of the notch portions 8 of the stationary body 1. Consequently, the locking shaft 2 is held in its depressed position. When the object 10 to be connected is superposed over tile other object 12 in a predetermined position, it is possible for beth the holding-member plate 5 and the front-end portion of the rotary shaft 7 to pass through tile receiving hole 11 of the other object 12. After completion of such passing through of the holding-member plate 5 and the front-end portion of the rotary shaft 7, the rotary shaft 7 is rotatably driven through a predetermined angle by the use of tools such as wrenches and the like to have the holding-member plate 5 crossed with the receiving hole 11 of the other object 12 at an angle of 90° behind the receiving hole 11 of the other object 12.

At this time, since the opposite end portions of the lock pin 3 are aligned in position with opposite end portions of the notch portions 8 of the stationary body 1 (which correspond to positions of the locking grooves 9 of the stationary body 1), the locking shaft 2 is driven forward under the influence of a resilient force exerted by the compression spring 4. As a result, the lock pin 3 is engaged with the locking grooves 9 of the stationary body 1, so that the objects 10, 12 are locked to each other.

In order to unlock the objects 10, 12, it is necessary to depress the locking shaft 2 by the use of tools such as wrenches and the like. When the locking shaft 2 is depressed, the opposite end portions of the lock pin 3 are disengaged from the locking grooves 9 of the stationary body 1. After that, tile rotary shaft 7 is so rotated as to have holding-member plate 5 aligned with the receiving hole t1 of the other object 12, whereby the other object 12 is released from both the holding-member plate 5 and the corresponding object 10. Consequently, when the object 10 is pulled forward relative to the other object 12, both the front-end portion of the rotary shaft 7 and the holding-member plate 5 are pulled out of the receiving hole 11 of the other object 12 in a front side of the receiving hole 12.

In the embodiment of the present invention shown in the drawings, the object 10 is a cover plate used in the coupling portion of the very high speed vehicle. On the other hand, the other object 12 is a body member of the very high speed vehicle. The stationary body 1 assumes a cylindrical shaft, is inserted in a mounting hole 19 of the object 10 from a front side thereof, and fixedly mounted on the object 10 by fastening a nut 20 threadably engaged with a threaded cylindrical portion 1a of the stationary body 1. The rotary shaft 7 is concentrically inserted in the stationary body 1. In a front-end surface of a front-end flange portion 7a of the rotary shaft 7, there is provided a slot 13. The depressing operation of the lock pin 3 is also conducted by the use of the same tools such as the wrenches and the like as those used in rotatably driving the locking shaft 2.

The holding-member plate 5 is mounted on the front-end portion of the rotary shaft 7 in an insertion manner so as to be non-rotatable relative to the rotary shaft 7, and axially fixed to the rotary shaft 7 by the use of a snap ring 6 which is mounted in an annular groove 18 of the rotary shaft 7. Also provided in the holding-member plate 5 is a pair of diametrically-arranged oblique abutting cam plate portions 14 through which the object 10 is brought into a close contact with the other object 12. A central angle of each of the notch portions 8 of the stationary body 1 is 90°. In the embodiment of the present invention shown in the above, the number of the notch portions 8 is two, and so is the number of the locking grooves 9 of the stationary body 1.

As described above, in the joint assembly of the present invention: when the holding-member plate 5 is crossed with the receiving hole 11 behind the other object 12, the locking shaft 2 is resiliently moved forward to have the opposite end portions of the lock pin 3 engaged with the locking grooves 9 of the stationary body 1. Such engagement of the lock pin 3 with the locking grooves 9 is firmly kept under the influence of the resilient force exerted by the compression spring 4. Consequently, the objects 10, 12 can be firmly connected with each other.

Further, in the joint assembly of the present invention: the stationary body 1 is fixedly embedded in the object 10 so as to be flush in surface with the same object 10; the rotary shaft 7 is rotatably embedded in the stationary body 1 so as to be flush in front-end surface with the stationary body 1; and, the locking shaft 2 is inserted in the central cavity portion 15 of the rotary shaft 7 and biased forward so as to have its front-end surface be flush with the front-end surface of the rotary shaft 7. Consequently, there is no projecting portions of the stationary body 1 in the vicinity of the joint assembly of the present invention, and, therefore there is no fear that any turbulence flows, eddies and the like are produced therein so as to increase drag. Consequently, the joint assembly of the present invention is adapted to be used with a cover plate connected with the coupling portion of the very high speed vehicle.

What is claimed is:

1. A joint assembly, comprising:
   a stationary body (1) fixedly embedded in one object (10) of two objects (10, 12) so as to have a stationary body surface be flush with a surface of said one object (10), said objects (10, 12) being connected with each other;

a rotary shaft (7) rotatably embedded in said stationary body (1) so as to have a rotary shaft front-end surface be flush with a front-end surface of said stationary body (1);

a holding-member plate (5) fixedly mounted on a lower-end portion of said rotary shaft (7);

a compression coil spring (4) axially inserted in a central cavity portion (15) of said rotary shaft (7);

a locking shaft (2) inserted in an upper-end portion of said central cavity portion (15) and having a locking shaft front-end surface be flush with said front-end surface of said rotary shaft (7);

a lock pin (3) which passes through an axially-elongated through-hole (17) of said rotary shaft (7) and is inserted into a through-hole (16) of said locking shaft (2), said axially-elongated through hole (17) extending in a diametrical direction of said rotary shaft (7), said through-hole (16) extending in a diametrical direction of said locking shaft (2);

a notch portion (8) provided in an inner peripheral surface of said stationary body (1) to permit an end portion of said lock pin (3) to be movable when said locking shaft (2) is rotatably driven, said notch portion (8) being provided with an axially-extending locking groove (9) in an end portion of a notch portion bottom surface, said locking groove (9) being engaged with said end portion of said lock pin (3); and a receiving hole (11) provided in the other one object (12) of said object (10, 12), said receiving hole (11) permitting both said holding-member plate (5) and a front-end portion of said rotary shaft (7) to pass therethrough;

whereby said lock pin (3) is engaged with said locking groove (9) when said rotary shaft (7) is rotated so that said holding-member plate (5) is crossed with said receiving hole (11) of the other one (12) of said objects (10, 12) at an angle of 90° behind the receiving hole (11).

2. The joint assembly of claim 1, wherein said rotary shaft (7) has a slot (13) provided in a front end flange portion of the shaft.

3. The joint assembly of claim 1, wherein said holding-member plate (5) has a pair of diametrically-arranged cam plate portions (14).

* * * * *